United States Patent Office 3,504,074
Patented Mar. 31, 1970

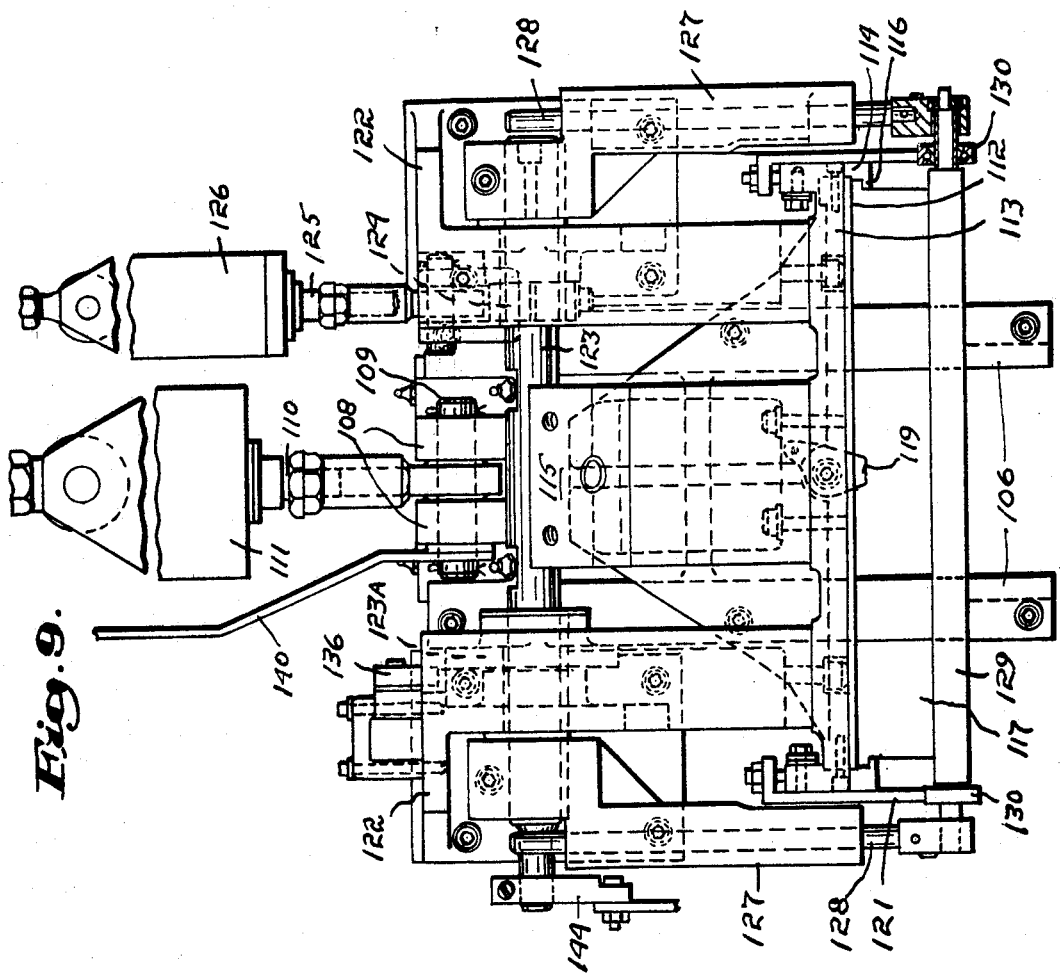

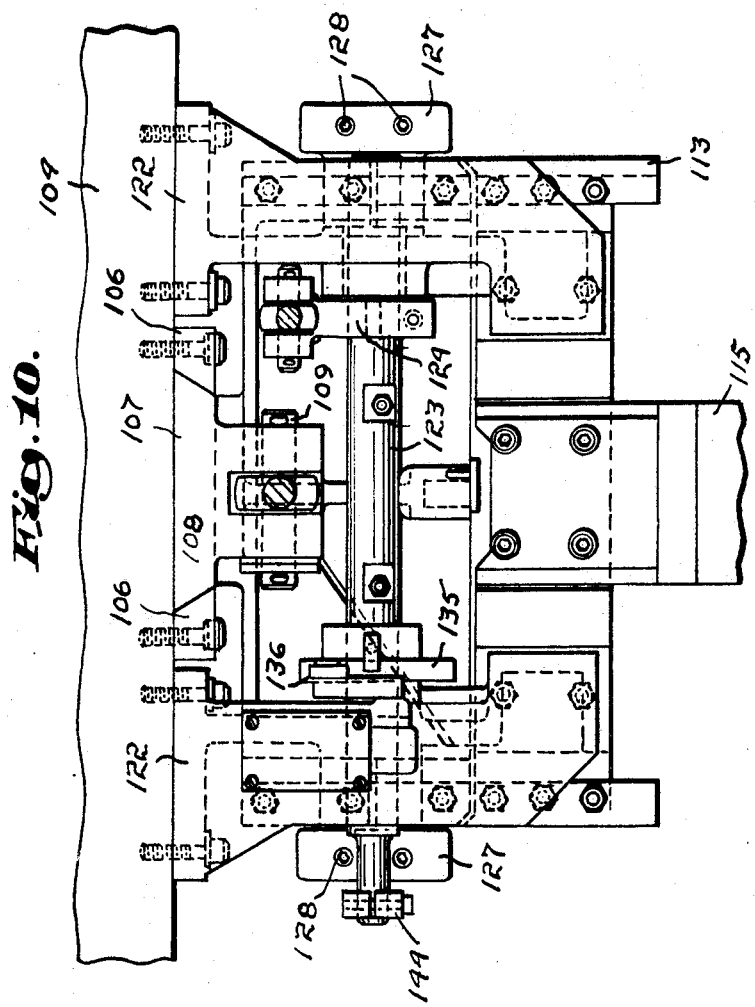

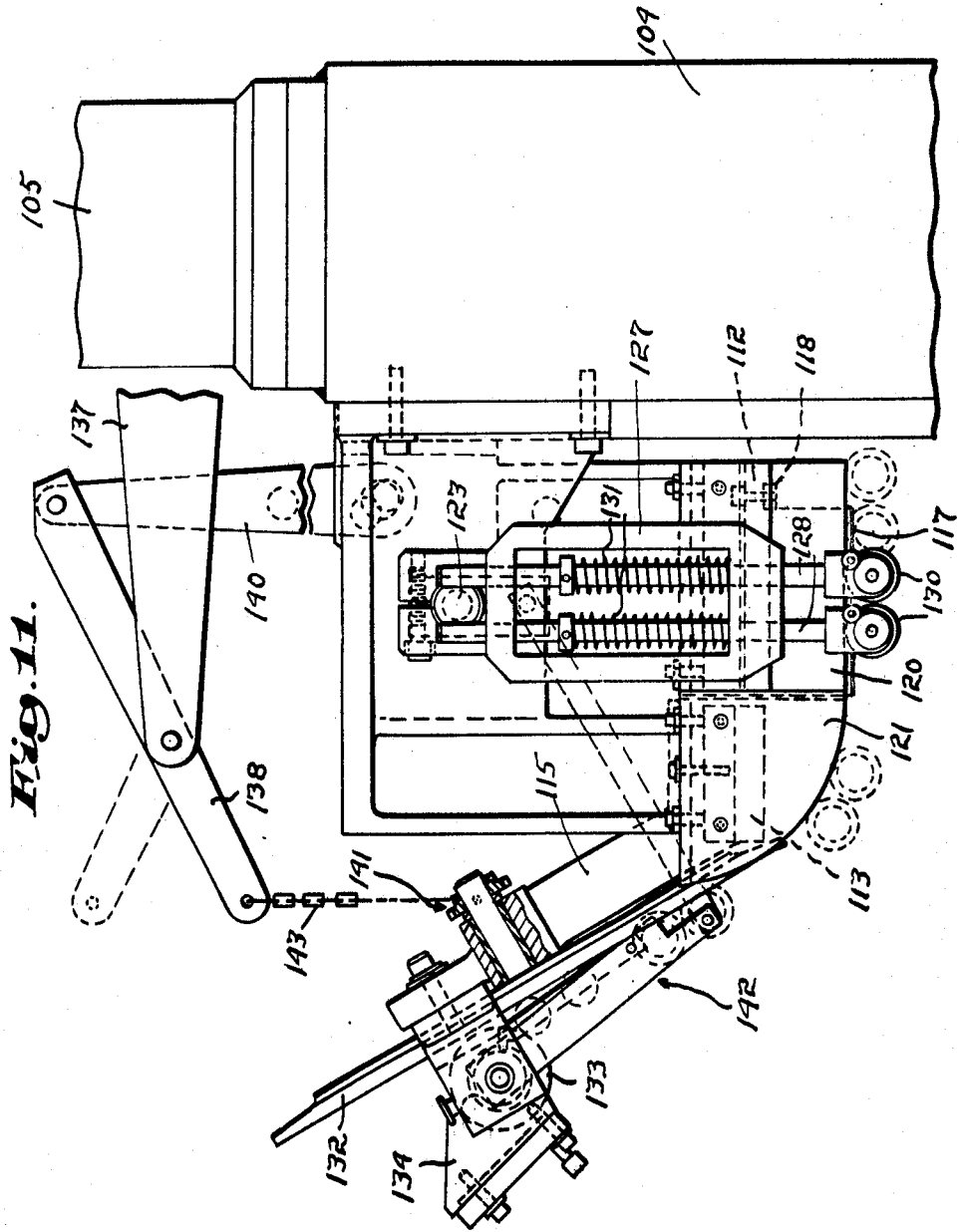

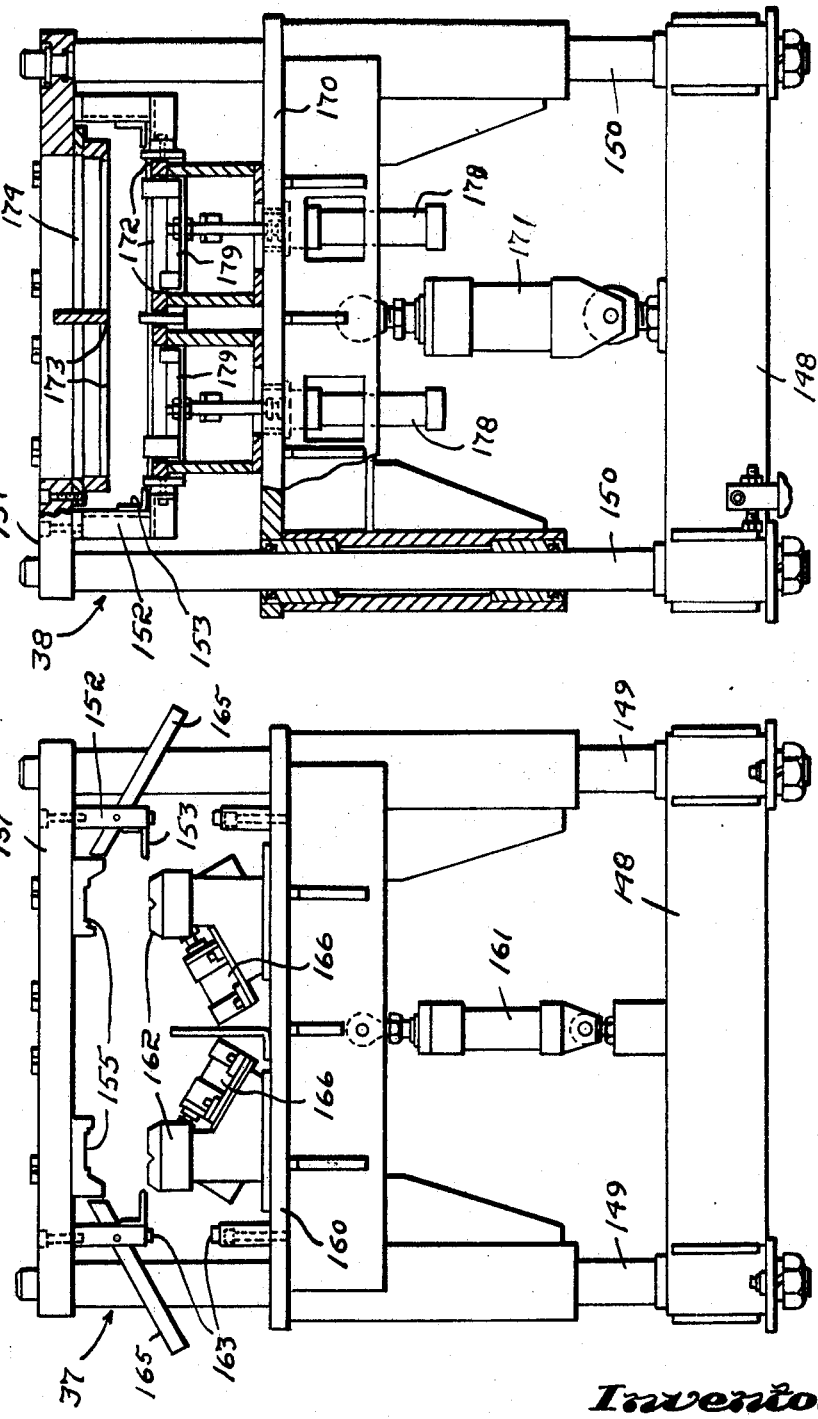

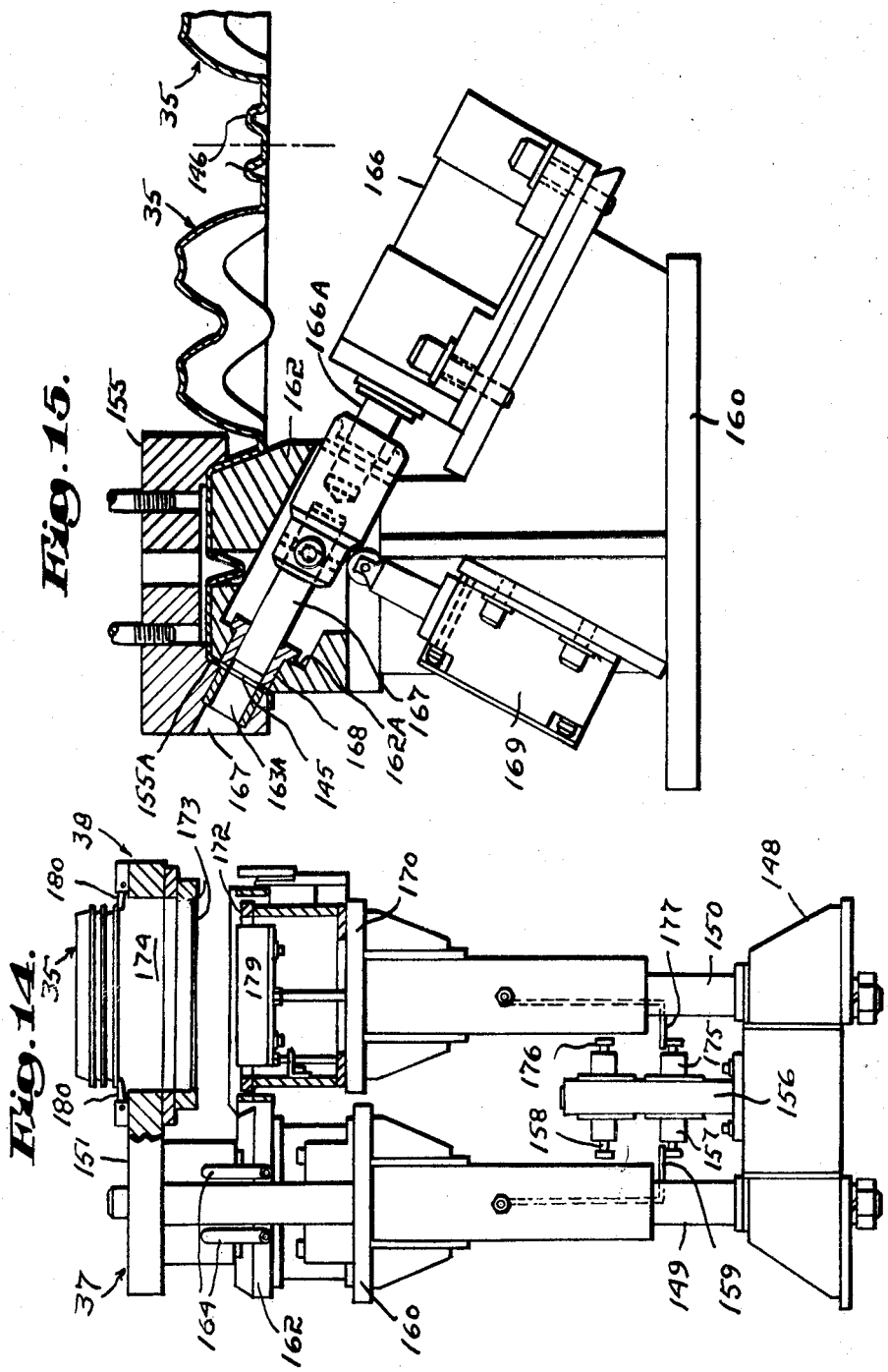

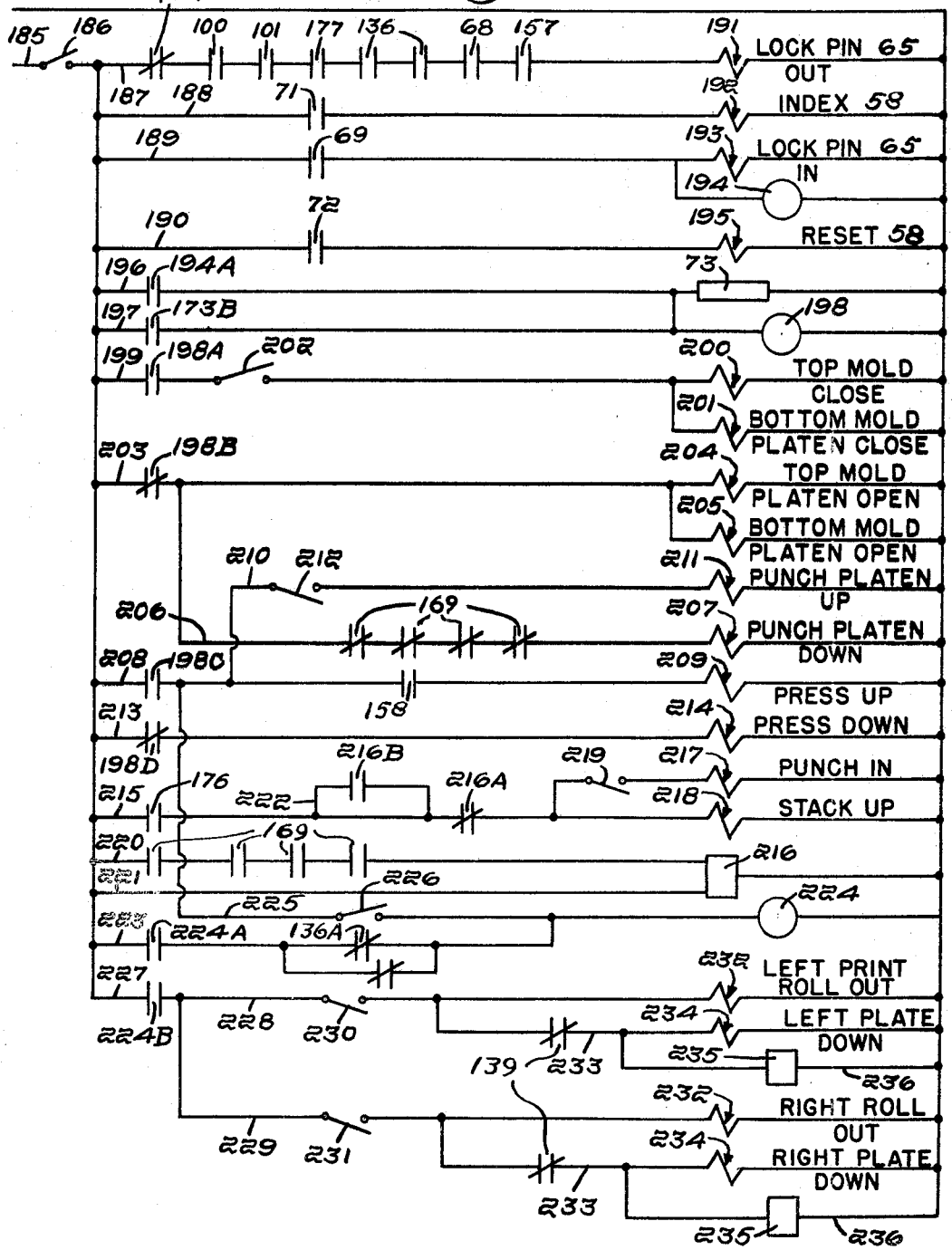

3,504,074
CONTINUOUS PRODUCTION OF ARTICLES FROM A ROLL OF THERMOPLASTIC MATERIAL
Gerald A. Snow, Cumberland Foreside, Maine, assignor to United Industrial Syndicate, Inc., Portland, Maine, a corporation of New York
Filed July 17, 1967, Ser. No. 653,886
Int. Cl. B29c 17/08
U.S. Cl. 264—153                                      11 Claims

ABSTRACT OF THE DISCLOSURE

Method of and apparatus for continuously forming articles from a roll of thermoplastic material with equal lengths of the sheet material from the roll being advanced step-by-step through heating, forming, and blanking stations with the sheet material marginally held until sufficiently cooled to permit the articles to be blanked without warping and with article printing while they are cooling, with a cooled article being clamped to position the leading article to be blanked and with the punching of the clamped article.

---

The formation of articles continuously from rolls of thermoplastic sheet material has not been satisfactory due to such factors as article warping, production rates that are too low, article damage during blanking, and the necessity of separate handling for printing.

A principal objective of the invention is to eliminate these objectionable factors, an objective attained by providing for the positive step-by-step advance of predetermined equal lengths of the sheet material from the supply roll through a heating station and through the forming station and to the blanking station with the sheet being marginally held until it has cooled to an extent ensuring that the articles may be blanked without warping.

Another objective of the invention is to ensure that the articles are so accurately positioned at the blanking station that they can be blanked fhom the sheet material without being damaged. Such positioning of the leading articles to be blanked is attained by holding the sheet material by members that coact with a trailing cooled article to clamp it in a precise step-relationship to the coacting blanking members at the blanking station. The feature is of particular importance where, as is preferred, the margins of the sheet material are released after becoming sufficiently cool and also where holes are to be punched in the articles, the clamping members then having punching means associated therewith.

A further objective of the invention is to provide a heat barrier at the infeed end of the forming station that consists of heat shields that are a part of the coacting molds. The molds are water cooled as are the heat shields, the mold cooling water being circulated through the heat shields. The heat shields include portions that coact to provide a transverse channel between that portion of the sheet in the forming station and the immediately adjacent portion still in the heating station, the channels being readily distorted by stresses that would otherwise damage the formed articles unless and until they had become sufficiently cool. The dwell period between sheet movement is thus minimized.

Another objective of the invention is to provide such apparatus with a printing station at a dwell between the forming and blanking stations and having printing means characterized by a printing plate moving vertically into and out of contact with articles and having its inking rolls swung from their inking position below the plate upwardly away from the plate and into ink-receiving engagement with a fixed inking platen.

Another objective of the invention is to control the article forming step with a timer which is started by the locking of the sheet material conveying means against movement at the end of a positive step and which controls certain of the other operations and the unlocking of the conveying means.

While the invention is concerned with various other articles, it is herein discussed with particular reference to egg cartons, and desirably, a plurality of articles are formed at each dwell at the forming station.

Yet another objective of the invention is to provide control circuitry that ensures safe positive action and enables certain of the functions at some of the stations to be omitted when desired.

In the accompanying drawings, there is shown an illustrative embodiment of the invention from which these and other of its objectives, novel features, and advantages will be apparent.

Figure 6:
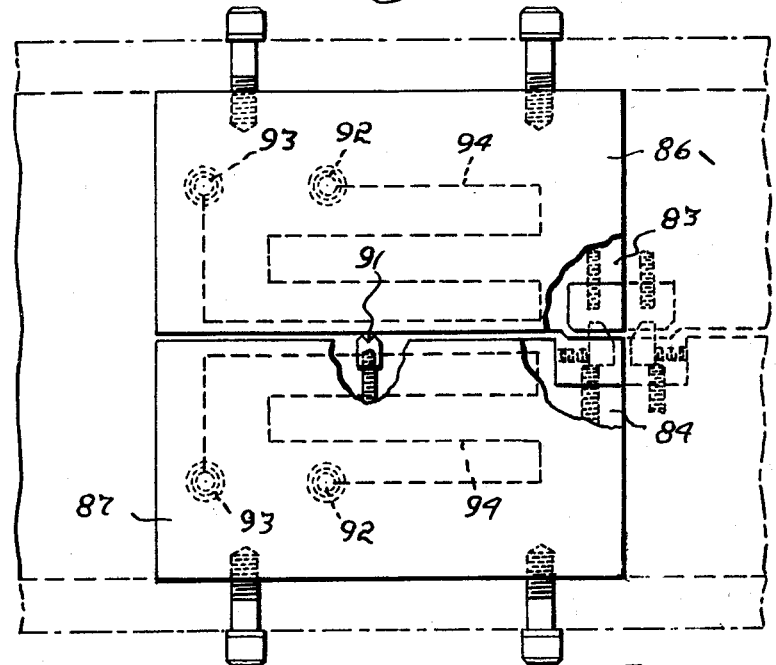
Figure 7:
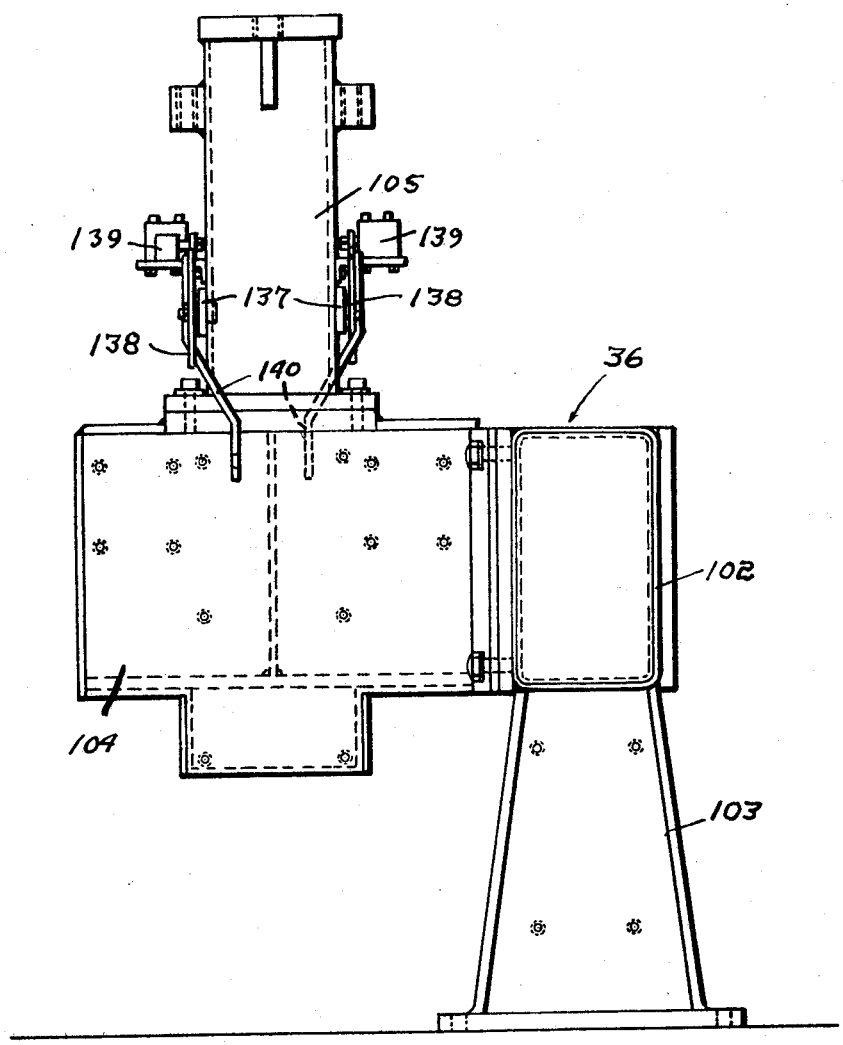
Figure 8:
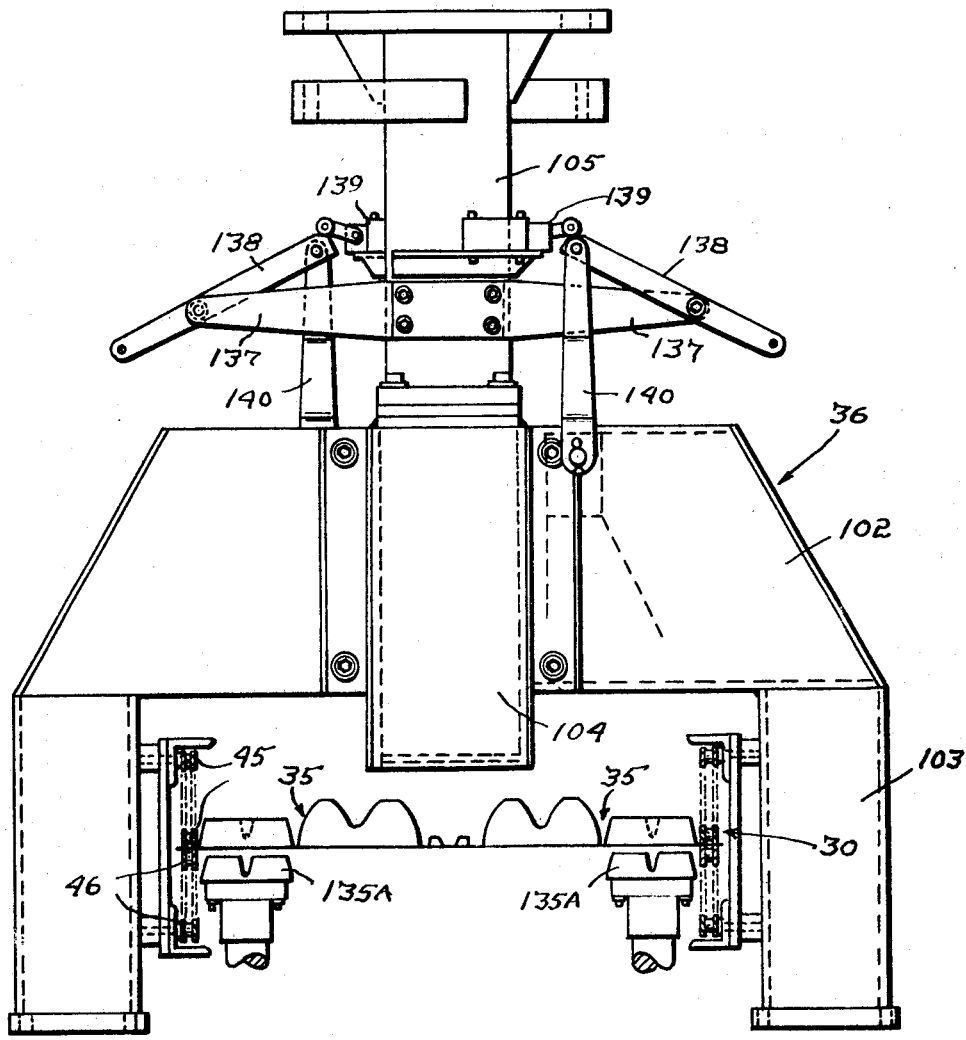

FIGURE 6 is a view of the molds as shown from the infeed end of the forming station, FIGURE 7 is a side elevation showing the supporting structure of the printing station on an increased scale, with the two printers omitted, FIGURE 8 is an end view of the structure shown in FIGURE 7, FIGURE 9 is a side view, on an increased scale, of one of the printers with the roll inking means omitted, FIGURE 10 is a top view thereof, FIGURE 11 is an end view of the printer, FIGURE 12 is a section showing, on an increased scale, the clamping and punching station, FIGURE 13 is a partly sectioned view of the apparatus as seen from the blanking end thereof, FIGURE 14 is a partly sectioned side view of the clamping and blanking stations, FIGURE 15 is a fragmentary and partly sectioned view showing one of the punches of the clamping station, and FIGURE 16 is a schematic view of the circuitry.

Figure 1:
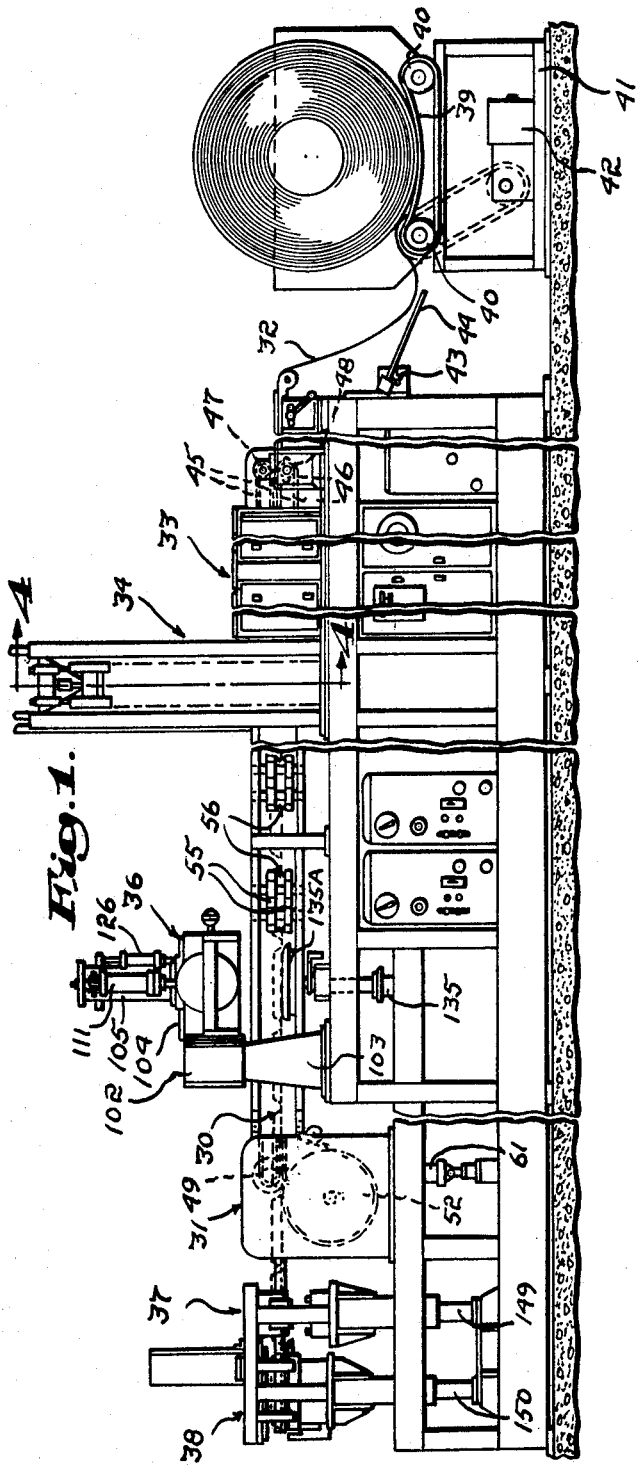
FIGURE 1 is a side view of the apparatus, broken to foreshorten the drawing.

Apparatus in accordance with the invention, as may be seen in FIGURE 1, has conveying means, generally indicated at 30, operable by a drive at the generally indicated indexing station 31, to convey a sheet 32 of a thermoplastic material step-by-step through a heating station, generally indicated at 33, best seen in FIGURE 15, to a forming station, generally indicated at 34, where, in the illustrative embodiment of the invention shown in the drawings, two transversely aligned egg cartons 35, are formed as an integral part of the sheet 32. The conveying means 30 advances the sheet and its thus formed cartons to a printing station, generally indicated at 36, and thereafter feeds the sheet 32 into a clamping and punching station, generally indicated at 37, and into a final station, generally indicated at 38 where the cartons 35 are blanked out from the sheet 32 and discharged.

In practice, the sheet 32 is supplied in a roll and such a roll is shown as supported by a belt 39 trained about a pair of rolls 40 in a stand 41. One of the rolls is driven by an electric motor 42 the operation of which is under the control of a normally closed switch 43. A counterweighted unit 44, pivotally mounted adjacent the infeed end of the conveying means 30, is disposed to be engaged by the sheet 32 if a predetermined slack develops and then to be so actuated as to open the switch 43 thereby to interrupt the unwinding of the roll until the excess slack is taken up.

The conveying means 30 consists of upper and lower transversely aligned pairs of chains 45 and 46 whose proximate courses travel in the same direction and grip between them the margins of the sheet 32. At the infeed end of the apparatus, the conveyors 45 and 46 are trained around sprockets 47 and 48, respectively, while at the indexing station 31, see FIGURES 2 and 3, the upper chains 45 are trained about sprockets 49 mounted on a shaft 50 and under slack take-up rolls 51.

At the index station, the lower pair of chains 46 are trained about relatively large sprockets 52 fast on a shaft 53 and over slack take-up rolls 54. The proximate courses of the chains are held in sheet gripping relation intermediate their ends and the intermediate stations by a series of pairs of shoes 55, yieldably urged towards each other by springs 56. The shafts 50 and 53 have intermeshing gears 50A and 53A, respectively, see FIGURE 3.

The drive for the chains 46 is at the index station end thereof and has a lever 57 centrally mounted adjacent one end of the shaft 53 for rotation independently thereof and with one end carrying a transversely slidable pin 58 yieldably backed by a spring 59 and with the other end pivotally connected to the stem 60 of a vertically disposed hydraulic ram 61. A disc 62 connected to one of the sprockets 52 is splined to the shaft 53 and has a series of equally spaced holes 63, each located to receive the pin 58 when brought in registry therewith by predetermined arcuate travel of the lever 57.

With the pin 58 entrant of a hole 63, the disc 62 and the lever 57 are locked together so that, as the ram 61 is operated to extend its stem 60, the shaft 53 is turned to a predetermined extent, advancing the conveyor means 30 and the sheet 32 one step.

Figure 3:
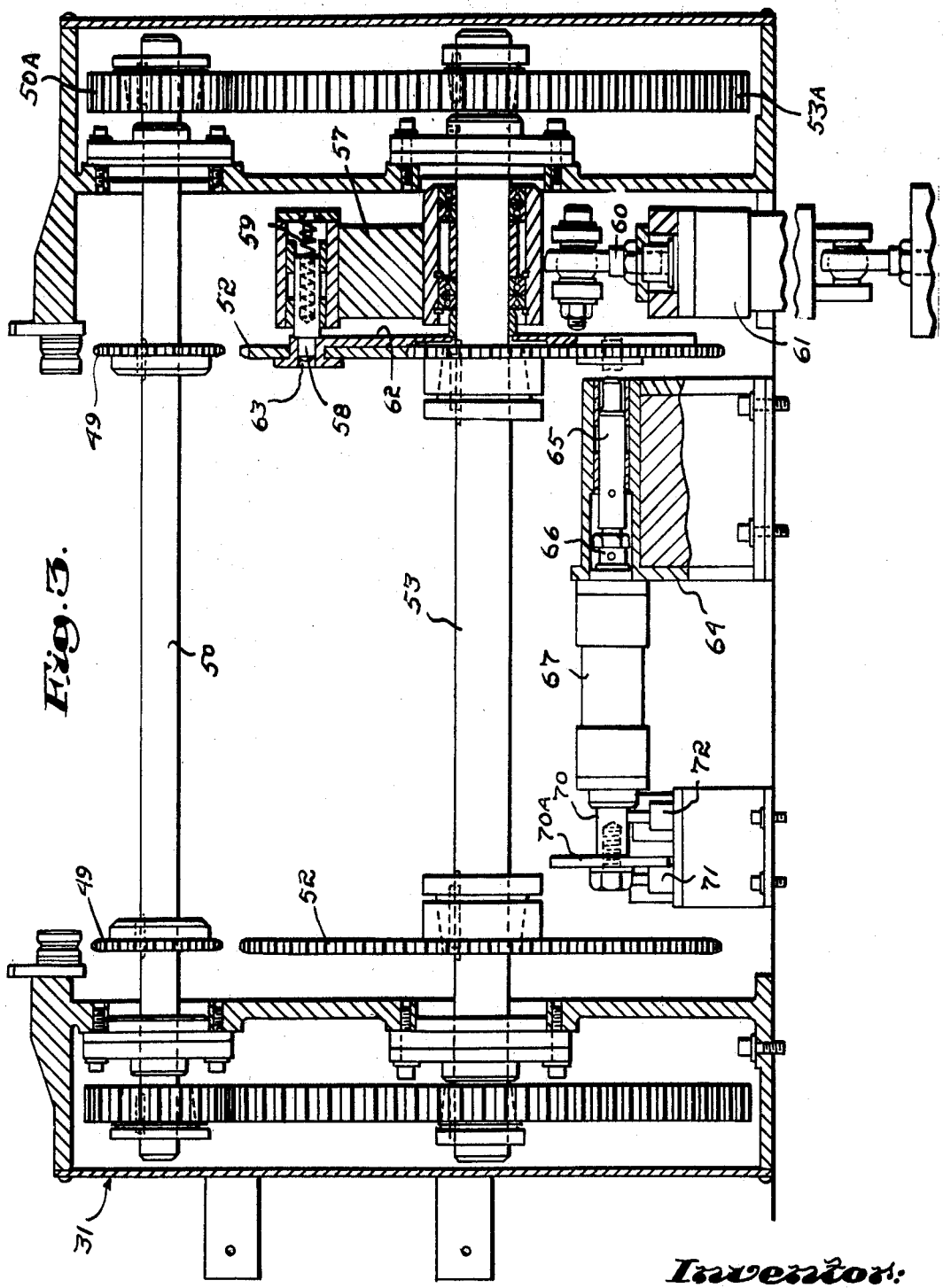
FIGURE 3 is a section taken approximately along the indicated lines 3—3 of FIGURE 2.

A support 64, see FIGURE 3, slidably supports a locking pin 65 connected to the stem 66 of a hydraulic ram 67 by which the pin 65 is driven into and out of its locking position. The locking pin 65 is so located that when driven into its locking position it enters the hole 63 then occupied by the indexing pin 58 at the end of the advancing step and thus unseats the indexing pin 58 so that the disc 62 and the shaft 53 are locked against turning while the ram 61 can now be operated to retract its stem 60 and thus swing the lever 57 in the opposite direction with the indexing pin 58 entering another hole 63 at the end of the reset stroke.

The rams at the indexing station 31 and elsewhere are conventional as are the valves which control the flow thereto to effect their operative position, the valves being operated by solenoids as is also conventional in the operation of hydraulic and pneumatic rams. The valves are not herein shown and it will be understood that each ram employed has a solenoid operated valve or valves in control thereof. While the switches are conventional, their location and function are important so that each switch is shown in the appropriate views and in the circuitry schematically illustrated in FIGURE 16.

Figure 2:
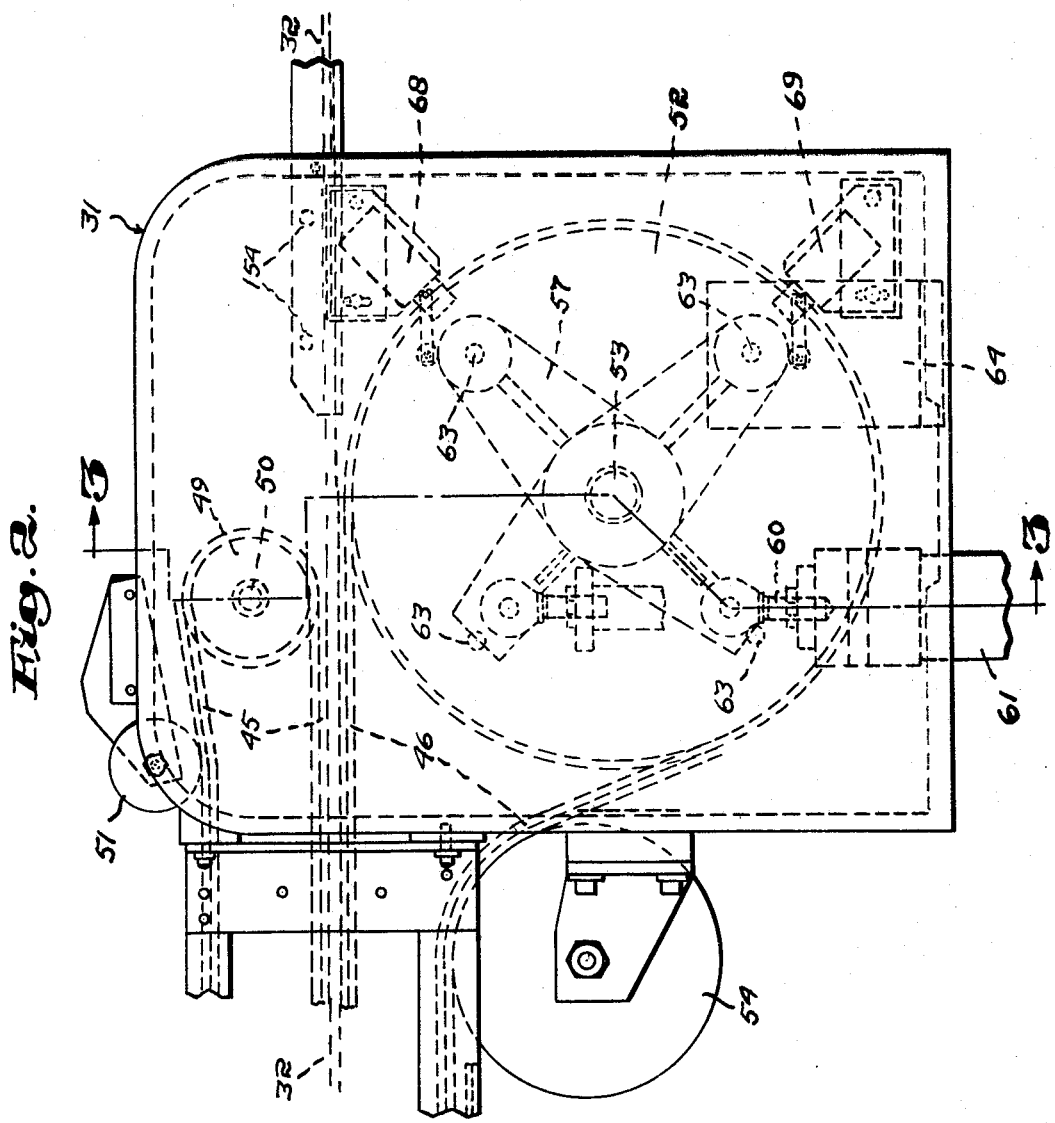
FIGURE 2 is a side view, on an increased scale, of the index station.

At the indexing station 31, see FIGURE 2, there is a limit switch 68, actuated by the lever 57 when it is in its reset position, and a limit switch 69 actuated when the lever 57 is in the position representing the end of an indexing step in the advance of the conveying means 30. In addition, see FIGURE 3, it will be noted that the ram 66 has a stem 70 provided with a flange 70A operable to actuate a limit switch 71 when the locking pin 64 is in its retracted, inoperative position and to actuate a limit switch 72 when the locking pin 65 is in its extended locking position.

As will subsequently be fully explained, advance of the conveying means 30 is impossible while the locking pin 65 is operatively positioned and it is while the conveying means are so held that the various operations are performed with the retraction of the locking pin 65 being controlled by a timer 73, see FIGURE 16, and with the operation of the timer 73 being initiated by the locking pin 65 being again operatively positioned after the lever 57 has been swung to complete a conveyor advancing step.

The heating station 33 is not herein detailed other than to note that it has heating means, electric for a preferred example, and that it is of sufficient length to ensure that the sheet 32 is sufficiently softened for the carton forming at the forming station 34. In practice, five steps of the conveying means are required to advance a carton-forming section through the heating station.

Figure 4:
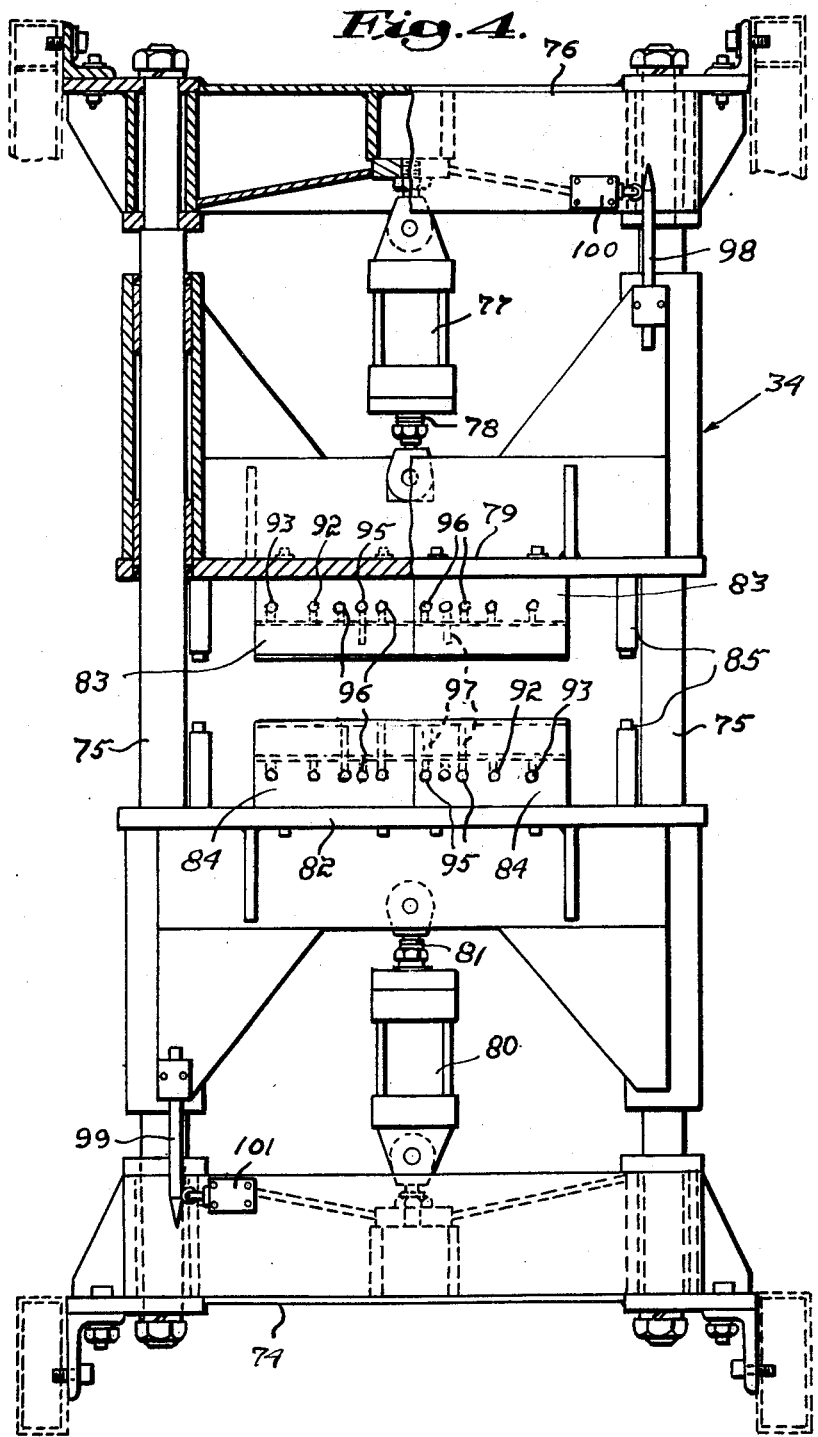
FIGURE 4 is a section showing the forming station on an increased scale, taken approximately along the indicated lines 4—4 of FIGURE 1.
Figure 5:
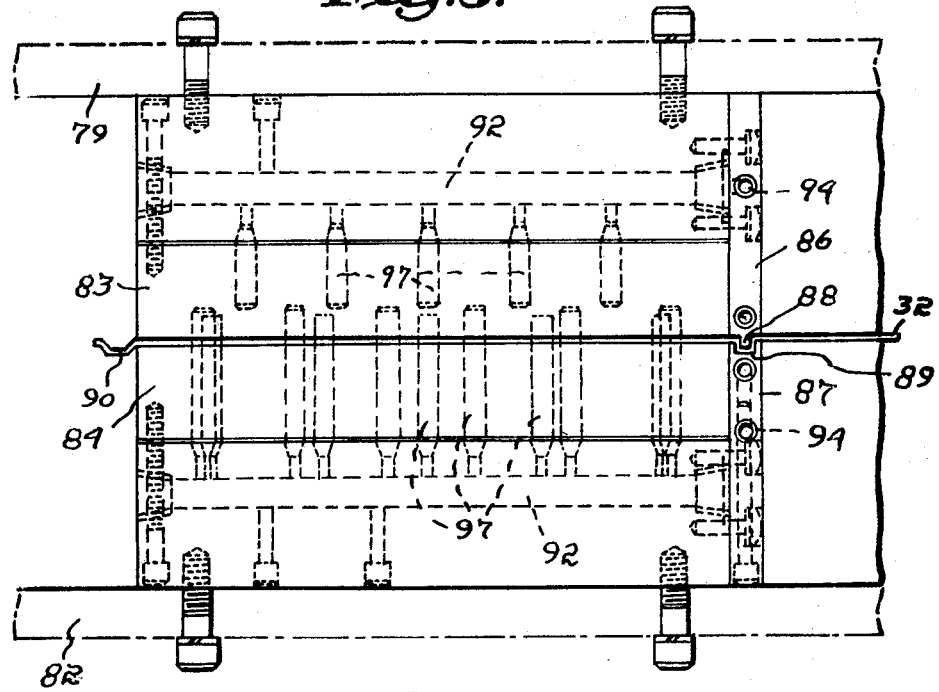
FIGURE 5 is a fragmentary section of the forming station in scale, showing the molds in side view.

As shown in FIGURES 4–6, the forming station 34 has a base 74 supporting a pair of vertical, transversely aligned posts 75 connected at their upper end by a head 76. The head 76 supports a hydraulic ram 77 whose stem 78 is connected to an upper platen 79 slidably guided by the posts 75. The base 74 has a hydraulic ram 80 connected thereto with its stem 81 connected to a lower platen 82 slidably guided by the posts 75.

The platen 79 has right and left upper molds 83 detachably attached thereto and complemental right and left lower molds 84 are detachably attached to the lower platen 82 and the platens carry stops 85 that become engaged when they are closed togethed thus to precisely space apart the upper and lower molds. Upper and lower heat shields 86 and 87 are attached to each of the molds 83 and 84, respectively, at the infeed end thereof. The bottom edges of the heat shield 86 are in the form of a tongue 88 disposed to enter the groove or channel 89 in the proximate edge of the heat shield 87 as will be apparent from FIGURE 5 from which and from FIGURE 1 it will also be apparent that the heat shields separate the forming station 34 from the heating station 33 and that when the upper and lower molds are brought together adjacent the interposed sheet, a transverse channel 90 is formed at the trailing ends of the cartons.

At this point, attention is directed to the fact that until the sheet has cooled to a predetermined extent, it is easily deformed and the function of the channels 90 is to provide a narrow area where deformation can occur as the sheet 32 with its formed cartons, is stepped from the forming station 34, such deformation being illustrated in FIGURE 5 at the outfeed ends of the molds.

From FIGURE 6 it will be noted that the molds may be regarded as having right or outer and left or inner portions with respect to a central zone inclusive of the mold insert 91 which forms the hinge between the cover of the egg carton and the bottom thereof. The molds are water cooled and each has water inlets 92 and outlets 93 extending lengthwise through each outer mold portion and in communication with the appropriate ends of an S-shaped conduit 94 in the heat shield secured thereto.

The inner mold portions have water inlets 95 and outlets 96 and vertical branches 97. In the case of an upper mold there are two outlets 96 and an intermediate inlet 95 and in the case of a lower mold, there are two inlets 95 and an intermediate water outlet 96 as required by the egg receiving pocket formation of the carton bottom. There is one series of branches 97 for each inlet 95. As the carton bottoms, due to the egg-receiving pockets, are more difficult to form than the relatively simple cover which may be quickly cooled, the water delivered through the inlets 92 may be substantially cooler than the water delivered through the inlets 95 and this has the advantage of providing maximum cooling effect in the heat barrier.

It will be noted that the upper and lower platens 79 and 82 carry actuators 98 and 99, respectively, the actuator 98 operating the limit switch 100 when the upper platen 79 is in its raised position and the actuator 99 operating the limit switch 101 when the lower platen 80 is in its lowered position.

It will be appreciated that the interval in which the molds are closed against the sheet 32 must be such to ensure the formation of the egg cartons and their cooling to an extent ensuring against deformation and this interval is controlled by a timer 73, see FIGURE 16.

One factor contributing to satisfactory production rates is that the timing interval is relatively short due to the use of the heat shields as part of the molds and the provisions of the transverse channels that take any lengthwise stresses in the sheet material 32 and become deformed thereby and prevent injury to the formed articles. Another important contribution factor is the fact that not only are the margins of the sheet material 32 firmly gripped between the chains 45 and 46 of the conveyor means 30 but also by the fact that those chains are of sufficient length to ensure that the sheet material, while held and advanced thereby, becomes sufficiently cool to insure against objectionable warpage when the articles are blanked therefrom. This cooling period is utilized to advantage by printing the articles, the printing station 36 being located relatively near the indexing station 31.

The formed cartons are stepped forwardly to the printing station 36 which is detailed in FIGURES 7–11 and shown as consisting of a bridge 102 supported by legs 103 and having a mount 104 extending rearwardly and centrally over the conveying means 30 and to each side of the mount 104 there is secured a printer, the printers being spaced so that each prints a cover of an appropriate one of the transversely aligned egg cartons. A support 105 is secured to the upper surface of the mount 104.

On each side of the mount 104 there are a pair of vertical gibs 106 for a slide 107 having spaced ears 108 in support of a pivot 109 connected to the stem 110 of an air-operated ram 111 pivotably secured to the upper end of the support 105.

The slide 106 includes bottom plates 112 and 113. The plate 112 has side bars 114 secured thereto and the plate 112 has an outwardly and upwardly inclined arm 115. On the inner surfaces of the side bars 114 there are flanges 116 which, with the undersurface of the plate 112 define a slideway for the printing plate 117, see FIGURE 9. At the rear end of the slideway there is a stop 118 and, at its front end, a pivoted, plate-retaining latch 119. Rear or inner cam plates 120 are adjustably attached to the side bars 114 and front or outer cam plates 121 are attached to the sides of the plate 113.

At each side of the slide 107 there is a bracket 122 fixed to the mount 104 with each rotatably supporting a shaft 123. Adjacent one bracket 122, one end of a bell crank 124 is fixed on the shaft 123 with its other end pivotally connected to the stem 125 of an air operated ram 126 pivotally connected to the upper end of the support 105.

An arm 127 is secured to the shaft 123 adjacent each of its ends. Each arm 127 slidably supports a pair of parallel rods 128 with the lower ends of corresponding rods rotatably supporting opposite ends of transverse, parallel ink rolls 129 yieldably urged upwardly for inking engagement with the printing plate 117 and provided with rollers 130 in engagement with the front and rear cam plates 120 and 121, respectively, by springs 131.

When air is delivered to the ram 126 of either printer to turn its shaft 123, the ink rolls 129 are swung upwardly away from their inking position into contact with the ink platen 132 rotatably supported adjacent the outer end of the arm 115 of that printer. Each printer has a rotatable ink roll 133 and an ink supply 134. The ink supply is conventional and may be of various constructions. The cam plates 121 keep the rolls 129 inoperatively positioned until they may contact the ink platen 132. In the upward position of the ink rolls 129, air may be delivered to the ram 111 thereby to bring the printing plate 117 downwardly into printing contact with the covers of the egg cartons.

The carton covers must, of course, be supported while being printed. For that reason, rams 135 below the path of the sheet 32 are provided with forms 135A, see FIGURES 1 and 7, each form disposed and dimensioned to fit within a cover portion of an egg carton 35 and the ram stroke be only sufficient to raise the carton covers as to provide firm support therefor when contacted by the printing plate 117. The fluid supply to each ram is subject to the same solenoid valve control as the ram 111.

As the movement of each printing plate 117 into and out of printing contact with the carton covers and the movement of the inking rolls 129 during a dwell must be precisely synchronized, the shaft 123 has a cam 123A fixed thereon to operate the switch 136 to hold the circuit open that controls the operation of the ram 111 unless the inking rolls 129 are in their upward, ink-receiving position.

In this connection, transverse members 137 are attached to opposite sides of the support 105. The transverse members 137 extend in opposite directions and a lever 138 is pivoted to the outer end of each of them, one lever 138 for each printer and functioning to operate the limit switch 139 thereof. Each lever 138 has an arm 140 pivotally secured thereto and to an end of the pivot 109 of that printer thereby to be responsive to vertical movements thereof.

At this point, it is noted that both the ink platen 132 and the roll 133 of the ink supply of each printer are rotated as by pawl and ratchet assemblies generally indicated at 141 and 142, respectively. The pawl and ratchet assembly 141 is actuated by a chain 143 connected to the appropriate lever 138 and the pawl and ratchet assembly 142 is actuated by an arm 144 fixed on the end of the shaft 123 of each printer.

The sheet 32 is advanced from the outfeed end of the conveying means 30 at the index station 31 to bring transversely aligned formed cartons 35 into the punching and clamping station 37, see FIGURES 12, 14 and 15. At the station 37, holes 145 are formed in the front walls of the carton covers to receive the locking projections 146 on the locking flaps 147 of the carton 35. From the clamping and punching station 37, the next step brings the sheet into the final station 38 where the cartons 35 are blanked from the sheet and from each other and discharged vertically from the apparatus in stacks.

As may best be seen in FIGURES 12–14, the stations 37 and 38 have a common base 148 supporting the vertical, transversely aligned posts 149 of the punching station 37 and the vertical, transversely aligned posts 150 of the blanking station 38. The posts 149 and 150 are interconnected by a transverse header 151 having depending supports 152 for one end of the marginal support 153 for the sheet 32 as it is pushed forwardly from the conveyor means 30 at the index station 31. The other ends of the marginal supports 153 are anchored as at 154 in the index station 31. The header 151 has a pair of seats 155, one for each of the carton covers. A support 156, see FIGURE 14, located between the posts, is provided with vertically spaced limit switches 157 and 158, the former engaged by the arm 159 when the platen 160 is in its lowered position and the latter when the platen 160 is in its raised position.

The platen 160 is slidably secured to the posts 149 and a hydraulic ram 161 secured to it and the base 148 is operative to raise the platen 160 from its lower inoperative position into its operative position in which forms 162 mounted on the platen 160, one for each seat 155 and shaped and dimensioned to be a fit in a cover, are so fitted and lift the sheet from the marginal supports 153 and clamp the carton covers against the seats 155 with stops 163 positively limiting upward movement of the platent 160.

The seats 155, as may best be seen in FIGURE 15, are open-ended channels of the cross sectional size and shape of the carton covers. The outer seat walls 155A are of the height of the front walls of the cartons and are of sufficient length to enable the wanted holes to be punched therein.

Each seat wall 155A, see FIGURE 15, has a pair of holes 164 spaced lengthwise thereof and disposed at an upward and outward angle and each hole 164 has a sleeve 164A in its inner end. The outer end of each hole 164 is in communication with a downwardly and outwardly inclined chute 165.

Adjacent each form 162 there are rams 166, one for each cover hole, to the stem 166A of which there is attached a punch 167 guided in an upwardly and outwardly inclined sleeve 168 in the wall 162A. Normally open micro-switches 169, one for each punch 167, are adapted to be closed during the operation of the rams 166 to punch the cover holes 145 and discharge the cut stock into the chutes 165.

The blanking station 38 has a platen 170 slidably attached to the posts 150 and a ram 171 secured thereto and to the base 148 is operable to reciprocate the platen 170 into and out of its raised operative position. The platen 170 includes marginal blades 172 disposed to coact with the cutting edges 173 marginally of ports 174 opening upwardly through the header 151. Vertically spaced limit switches 175 and 176 are mounted on the support 156 with the switch 175 operated by the arm 177 when the platen 170 is lowered and the switch 176 operated when the platen 170 is raised.

The platen 170 carries rams 178, one below each port 174 and provided with a head 179 operative to carry the blanked cartons 35 upwardly through the ports 174 when raised by the rams 178. Discharged cartons 35 are marginally caught by the pivoted fingers 180, see FIGURE 14, which yield to permit the passage of a carton upwardly between them but block their return whereby the blanked cartons 35 are discharged in easily handled stacks.

It will be noted that in the station 37, the sheet material is not only clamped during the punching operation but is precisely positioned due to the shape and dimensions of the coacting clamping portions. As the blanking station is the next and final step, the sheet 32, positively clamped in its correct position at the punching station 37 is precisely positioned in the blanking station with the sheet held against the cutting edges 173. It will be noted, see FIGURE 15, that at the clamping station 37, the sheet material is lifted to seat a part of each formed article, a carton cover, against the seats 155 which are shown as open-ended channels of a cross sectional shape such that the articles are centered transversely when clamped. It will also be noted that the forms 162, see FIGURE 14, are so shaped and dimensioned as to insure that the cartons are centered longitudinally in their clamped position.

Since the sheet is operatively positioned at the cutting station 38 when the ram 161 is energized, the ram 161 is held extended until the cutting stroke effected by the ram 171 has been completed with the means for so doing being detailed in connection with the description of the circuitry and the operation of the apparatus.

In FIGURE 16, the circuitry, insofar as it relates to the advance of the conveyor means 30 and the operations at the forming, printing, clamping and punching, and blanking stations, is schematically illustrated.

The circuit 185 includes a control switch 186 and a series of leads of which the leads 187, 188, 189, and 190 are first discussed.

The lead 187 includes the solenoid operated valve 191 effecting the operation of the hydraulic ram 67 to withdraw the locking pin 65 to permit the advance of the conveyor means. The lead 187 is controlled by a series of normally open switches and the normally closed switch 73A of the timer 73, the normally open switches being the switches 100 and 101 closed when the molds are open, the switch 177 closed when the blanking platen 170 is down, closed when the printing platen 117 is up, the switch 67 closed when the indexing pin 58 is in its reset position, and the switch 157 closed when the punch or clamping platen 160 is down.

It is thus apparent that if the hydraulic rams at the forming, printing, punching and clamping stations are inoperatively positioned and the indexing pin 58 is operatively positioned, the locking pin 65 is withdrawn.

The lead 188 controls the solenoid operated valve 192 controlling the operation of the ram 61 to effect forward or indexing movement of the lever 57 and is energized when the normally open switch 71 is closed as it is when the locking pin 65 is withdrawn thus to effect a forward step of the conveyor means 30.

The lead 189 includes the solenoid operated valve 193 by which the ram 67 is controlled to drive the locking pin 65 into a hole 63 and unseat the indexing pin 58 therefrom. The lead 189 is energized when the normally open switch 69 is closed at the completion of the indexing movement of the lever 57 whereby the conveying means 30 is again securely locked so that various functions at the different stations can be carried out. The circuit 189 also includes a relay 194 in parallel with the solenoid valve 193.

The lead 190 includes the switch 72 which is closed when the locking pin 65 is operatively positioned, and the solenoid operated valve 195 by which the ram 61 is operated to reset the lever 57 with its pin 58 entrant of another hole 63.

The lead 196 has a normally open switch 194A of the relay 194 and closed when the relay 194 is energized and is also provided with the timer 73 while the lead 197 includes the normally open timer switch 73B and the relay 198.

With the timer 73 now in operation, the lead 197 is held closed for a predetermined interval with the timer switch 73A now open.

The lead 199 includes the relay switch 198A which is closed when the relay 198 is energized, then to energize the parallel, solenoid-operated valves 200 and 201 which control the rams 77 and 80, respectively, to effect the closing of the carton forming molds against the sheet 32. The lead 199 also has a manually operated switch 202 by which the forming station 34 may be bypassed.

The lead 203 includes the normally closed switch 198B of the relay 198 and the parallel, solenoid-operated valves 204 and 205 by which the rams 77 and 80 are actuated to open the molds. In this connection, it will be noted that the lead 206 is also controlled by the relay 198 via the switch 198B to energize the solenoid-operated valve 207 by which the punch or clamping platen 160 is lowered by the ram 161, the lead 206 also including the normally closed contacts of the switches 169 that become opened when the punches 167 are operatively positioned.

The lead 208 includes the normally open switch 198C closed when the relay 198 is energized, the normally open limit switch 158 closed when the clamping or punch platen 160 is raised and the solenoid operated valve 209 by which the press or blanking platen 170 is raised. The lead 208 also includes a parallel lead 210 also controlled by the switch 198C and including a solenoid operated valve 211 by which the punch or clamping platen 160 is raised by the ram 161 so that the blanking operation cannot be carried out unless the platen 160 has been raised to position the sheet 32 accurately and to clamp it against movement. The lead 210 is shown as also including a manually operated switch 212 enabling the clamping station to be bypassed.

The lead 213 has a normally closed relay switch 198D and the solenoid operated valve 214 by which the blanking platen 170 is lowered by the ram 171 until the relay 198 is de-energized by the timer 73.

The lead 215 includes the normally open switch 176 which is closed when the blanking platen 170 is raised, the normally closed switch 216A of the time delay relay 216 and the parallel solenoid operated valves 217 and 218 by which the punching rams 166 and the stacking rams 178, respectively, are raised. The rams 166 and 178 are of a type automatically returned to their inoperative position when their valve-operating solenoids are de-energized. The clamping and punching station 37 may be bypassed by opening the manually operated switch 219 in control of the solenoid operated valve 217 which also renders the blanking station inoperative.

The lead 220 includes the normally open contacts of the switches 169 which are closed when the punches are operative and the time delay relay 216, the relay 216 being of a solid state type requiring, to be operative, that it be continuously energized by the lead 221. The leads 215 and 220 have an interconnection 222 provided with the normally open switch 216B of the time delay relay 216. By this arrangement, a timed holding circuit is provided for the solenoid operated valves 217 and 218.

The lead 223 includes the normally open switch 224A of the relay 224, the normally closed contacts 136A of the switches 136, arranged in parallel, and the relay 224. A connection 225 between the lead 208 and the relay 224 enables the relay 224 to be energized whenever the relay switch 198C is closed, the timer 73 then being energized so that the connection 225 becomes a timed holding circuit. The connection 225 is shown as having a manually operated switch 226 enabling the printers to be placed out of operation.

The lead 227 includes the normally open switch 224B of the relay 224 and parallel leads 228 and 229 controlled by manually operated switches 230 and 231, respectively, enabling either printer to be placed out of service. As the leads 228 and 229 are otherwise identical, the same reference numerals are used for the components of both leads. Each includes the solenoid valve 232 by which the ink rolls 129 are swung into their ink-receiving position and a parallel lead 233 provided with the normally open limit switch 139 opened when the rolls are thus positioned and the solenoid air valve 234 by which the printing plate 117 is moved vertically. As the rams of both printers are returned to their inoperative position when their solenoids are disengaged, each lead 233 includes a normally closed switch 235 of the time delay relay 235 in the parallel lead 236.

From the foregoing, it will be apparent that the invention provides for the continuous forming of articles from thermoplastic sheet material on a basis well adapted to insure quality control and that production requirements can be met.

I claim:

1. In apparatus for forming articles from a roll of thermoplastic sheet material, heating and forming stations, means to advance equal lengths of the sheet material step-by-step through said stations, said advancing means continuously holding the margins of said sheet material against warpage and extending for a distance such that each formed article is sufficiently cool to be no longer subject to warping when it is released from said advancing means, the heating and forming station being so spaced that a single step brings a portion of the sheet material needed for article forming from the heating station into the forming station, the forming station including mold members consisting of article forming portions that coact during a dwell and heat shields at the infeed edges of the mold members and including portions that coact during a dwell to form a transverse channel that is readily deformed by lengthwise stresses developing during the next dwell which would otherwise damage the formed articles unless sufficiently cooled, and conduits for a coolant extending through said article forming portions and said heat shields.

2. In apparatus for forming articles from a roll of thermoplastic sheet material, heating, forming and printing stations, means to advance equal lengths of the sheet material step-by-step through said stations, said advancing means continuously holding the margins of said sheet material against warpage and extending for a distance such that each formed article is sufficiently cool to be no longer subject to warping when it is released from said advancing means, said printing station having a printing plate, first means to move the printing plate downwardly and upwardly in a vertical path into and out of printing contact with a portion of each article during a cooling dwell, an inking platen fixed at one side of said path and above the inking plate, at least one ink roll, second means to swing the ink roll from an inking position in engagement with the printing plates upwardly and outwardly into ink-receiving engagement with the fixed inking platen, and control means rendering the first means operable only when the roll is in engagement with the platen and the second means operable only when the printing platen is raised.

3. In apparatus for forming articles from a roll of thermoplastic sheet material, a row of stations, means to advance equal lengths of the sheet material through said stations, said stations being successively heating, forming, and blanking stations, said blanking station being spaced from said forming station a distance such that each formed article is sufficiently cool when it reaches said blanking station to be blanked without warping, said forming and blanking station each including coacting members and means provided with electrically operated controls to effect their operative and inoperative relationships, said advancing means continuously holding the margins of the sheet material against warping from its entry into the heating station to a zone near said blanking station, means operable to effect a step-by-step operation of said advancing means including a lock operable to prevent movement of said advancing means to start a dwell and provided with electrically operated controls to effect its engaged and disengaged positions, means operable to energize the control effecting the engaged lock position at the completion of a step, a timer control energized when said lock is engaged then to energize the electrically operated controls by which the operative rerationship of the coacting members is effected, the electrically operated means by which the inoperative relationship of coating members is inoperatively positioned being energized whenever the timer is de-energized, and the control by which the lock is disengaged being energized to terminate the dwell when the coacting members are all inoperatively positioned.

4. The apparatus of claim 3 and a station between the forming and blanking station and having a printer operable to print an article during a cooling dwell, the printer including coacting portions, and means operable to space said portions apart to receive the sheet between them and to close them together in engagement with a portion of each article, one portion being a printing plate and the other portion being a backer, the operating means having electrically operated controls, one operable to effect the closing of the coacting portions when the timer is energized and the other being operable to effect the open position thereof when the timer is de-energized, the control by which the lock is disengaged also requiring the inoperative position of the coacting portions of the printer.

5. The apparatus of claim 3 in which means extend from the zone at the outfeed end of the chains to the infeed side of the blanking station and loosely support the sheet material as it is pushed forwardly from that zone, and clamping means at the infeed side of the blanking station including complemental clamping portions coacting with a formed article to establish a clamped sheet material position that has a precise step relationship with the position of the coacting members of the blanking station and means operable to effect a spaced apart relationship of the clamping portions to receive the sheet between them and to effect a clamped, article-positioning relationship thereof, the operating means having electrically operated controls, one operable to effect the closing of the clamping portions and energized only when the timer is energized and the other operable to effect the open position thereof and operable only when the timer is deenergized, the control by which the lock is disengaged also requiring the inoperative relationship of the coacting portions of the clamping means.

6. In apparatus for forming articles from a roll of thermoplastic sheet material, a row of stations, said stations being successively heating, forming, clamping and blanking stations, means to advance equal lengths of sheet material through said stations, said blanking station being spaced from said forming station a distance such that each formed article is sufficiently cool when it reaches said blanking station to be blanked without warping, said forming, clamping and blanking station each including coacting members, said advancing means including a conveyor section continuously holding the margins of the sheet material against warping during its passage through the heating and forming stations and until it reaches a zone near said blanking station, and a section extending from the outfeed end of the conveyor section into the clamping station and loosely supporting the sheet material as it is pushed forwardly by the conveyor section, and means operable between steps to bring the coacting members first into and then out of their coacting relationship, said clamping station being at the infeed side of the blanking station, with its coacting members coacting with a formed article to establish a clamped sheet material position that has a precise step relationship with the coacting members of the blanking station.

7. The apparatus of claim 6 in which one of the coacting members of the blanking station is fixed and in the form of a lengthwise channel whose cross sectional size and shape is an article guideway and the other is in the form of a vertically movable head, the channel and head mating when operatively positioned to place the clamped article in a predetermined position laterally considered.

8. The apparatus of claim 7 in which corresponding walls of the channel and head have female and male die cutting portions and means connected to the male die cutting portion and operable to effect engagement thereof with the female die cutting portion and operable only when the channel and head are mated.

9 The apparatus of claim 6 in which the blanking station includes coacting blanking members, one above the other and fixed, the other blanking member being vertically movable upwardly towards and downwardly out of coacting relationship with the fixed blanking member, means operable to effect coacting and spaced apart relationships of the blanking members, the uppermost blanking member having a port dimensioned to receive a blanked article, stacking means of which the uppermost blanking member is a part, and means movable with the lowermost blanking member and operable to raise a blanked article through the port and into the stacking means and operable only during the coacting relationship of the blanking member 10. In the continuous production of articles from a roll of thermoplastic sheet material, the steps of advancing equal lengths of the sheet material step-by-step, heating the sheet material as it is advanced to render successive lengths plastic at a predetermined dwell, forming at least one article in each plastic length at an adjacent dwell while the temperature of the material is such that the article is subject to distortion and simultaneously forming at the trailing edge of that length a transverse channel that is a deformable barrier against stresses developing during the next subsequent article forming step that would otherwise deform the proximate formed article, and advancing that length through a series of dwells until it is sufficiently cool to prevent the article from warping while continuously holding the margins of the sheet against warping.

11. The method of claim 10 and the subsequent steps of freeing the margins of the sheet, clamping the sheet at each dwell by a formed article to effect a predetermined position thereof transversely of the path of the moving sheet, and blanking the sheet at an adjacent subsequent dwell.

References Cited

UNITED STATES PATENTS

| 2,889,651 | 1/1959 | Baldanza | 264—129 XR |
| 3,115,677 | 12/1963 | Thiel | 18—19 |
| 3,186,034 | 6/1965 | Taylor | 18—19 |
| 3,228,066 | 1/1966 | Rippstein | 18—19 |
| 3,240,851 | 3/1966 | Scalora | 264—153 |
| 3,414,937 | 12/1968 | Malmgren | 18—1 |

WILLIAM J. STEPHENSON, Primary Examiner

U.S. Cl. X.R.

18—4, 19; 264—296, 297, 322